United States Patent
Williamson

(10) Patent No.: US 7,235,746 B2
(45) Date of Patent: Jun. 26, 2007

(54) MODULAR APPARATUS FOR ELECTRONIC SCALES AND A METHOD FOR ASSEMBLING SAME

(75) Inventor: Sidney W. Williamson, Las Cruces, NM (US)

(73) Assignee: Metro Corporation, Las Cruces, NM (US)

( * ) Notice: Subject to any disclaimer, the term of this patent is extended or adjusted under 35 U.S.C. 154(b) by 74 days.

(21) Appl. No.: 11/075,559

(22) Filed: Mar. 9, 2005

(65) Prior Publication Data

US 2006/0201720 A1   Sep. 14, 2006

(51) Int. Cl.
G01G 21/28 (2006.01)
H05K 7/14 (2006.01)

(52) U.S. Cl. ............ 177/126; 177/238; 361/726; 361/732; 361/740; 361/747; 361/759; 361/801

(58) Field of Classification Search ........ 177/126–129, 177/177, 238–244; 361/726, 732, 740, 747, 361/759, 801
See application file for complete search history.

(56) References Cited

U.S. PATENT DOCUMENTS

| | | | |
|---|---|---|---|
| 1,789,484 A | 1/1931 | Walker | |
| 3,811,523 A | 5/1974 | Artwick et al. | |
| 3,961,676 A | 6/1976 | Terraillon | |
| 4,043,413 A * | 8/1977 | Schaenen | 177/126 |
| 4,258,812 A | 3/1981 | Pfeiffer | |
| 4,281,727 A | 8/1981 | Meeks | |
| 4,355,692 A | 10/1982 | Ostrelich | |
| 4,458,771 A | 7/1984 | Hanssen et al. | |
| 4,739,848 A | 4/1988 | Tulloch | |
| 4,802,540 A * | 2/1989 | Grabovac et al. | 177/211 |
| 4,819,750 A | 4/1989 | Carnevale | |
| 4,832,142 A | 5/1989 | Germanton | |
| 4,844,189 A | 7/1989 | Shisgal et al. | |
| 5,094,307 A | 3/1992 | Aschke | |
| 5,133,421 A | 7/1992 | Wang | |
| 5,141,065 A | 8/1992 | Maxwell et al. | |
| 5,708,236 A | 1/1998 | Shaanan et al. | |
| 5,721,400 A | 2/1998 | Haraldsson et al. | |
| 5,731,548 A | 3/1998 | Williamson et al. | |
| 5,801,338 A | 9/1998 | Williamson | |
| 5,955,705 A | 9/1999 | Germanton | |
| 6,111,760 A * | 8/2000 | Nixon | 361/814 |
| 6,417,466 B2 | 7/2002 | Gross et al. | |
| 6,590,166 B2 * | 7/2003 | Yoshida | 177/25.13 |
| 6,606,249 B2 * | 8/2003 | Chikawa et al. | 361/760 |
| 6,608,260 B2 | 8/2003 | Montagnino et al. | |
| 6,639,158 B2 | 10/2003 | Germanton | |
| 6,677,540 B1 | 1/2004 | Moretto | |
| 6,689,964 B2 | 2/2004 | Petrucelli | |

(Continued)

OTHER PUBLICATIONS

Patent Cooperation Treaty International Search Report for International application No. PCT/US06/07478, Sep. 6, 2006, 6 pages.

*Primary Examiner*—Randy W. Gibson
(74) *Attorney, Agent, or Firm*—Brooks Kushman P.C.

(57) ABSTRACT

A modular apparatus for an electronic weighing scale is disclosed having a battery housing, a printed circuit board and a display fastened together and to a base of the scale. The printed circuit board may be adapted to accommodate a number of displays for various scale models. Additionally, a method for assembling an electronic weighing scale is disclosed.

15 Claims, 4 Drawing Sheets

U.S. PATENT DOCUMENTS

| | | |
|---|---|---|
| 6,797,894 B2 | 9/2004 | Montagnino et al. |
| 6,812,414 B2 | 11/2004 | Nakagawa |
| 7,060,914 B2 * | 6/2006 | Suzuki ................ 177/238 |
| 2002/0104690 A1 | 8/2002 | Schurr |
| 2003/0066690 A1 | 4/2003 | Germanton |
| 2003/0089531 A1 | 5/2003 | Montagnino et al. |
| 2003/0209086 A1 | 11/2003 | Schurr et al. |
| 2004/0057578 A1 * | 3/2004 | Brewer |
| 2004/0083825 A1 | 5/2004 | Tsutaya |
| 2004/0084227 A1 | 5/2004 | Germanton |

* cited by examiner

MODULAR APPARATUS FOR ELECTRONIC SCALES AND A METHOD FOR ASSEMBLING SAME

BACKGROUND OF THE INVENTION

1. Field of the Invention

One aspect of the invention relates to electronic scales, and more specifically, relates to controls, displays and power supplies for electronic scales.

2. Background Art

Platform weighing scales have been utilized to measure the weight of a user for many years. One variety of platform weighing scales is an electronic scale, which measures either analog or digital measurement data which corresponds to a weight of an object or user placed upon the platform of the scale. A display is provided within the scale, which is viewable externally for displaying the weight of the user. Ornamental and structural differences of scales, in combination with various features provided in scales require scale manufacturers to provide various scale models to satisfy consumers demands and preferences. Various scale models often have model specific components and often are manufactured separately.

In light of the foregoing, what is needed is a way to simplify the components and assembling of various scale models in a manufacturers scale model product line.

SUMMARY OF THE INVENTION

An aspect of the present invention is to provide an apparatus for an electronic weighing scale, which includes a battery housing, a printed circuit board (PCB) and a display. The PCB or display is fastened to the battery housing. The PCB and display are powered by the battery housing and are operatively connected for providing a signal to the display.

Another aspect of the present invention may include a modular apparatus for an electronic weighing scale. The modular apparatus includes a PCB fastened to a display. The PCB is adapted to accommodate a number of displays of varying sizes and/or fastener locations.

A further aspect of the invention is to provide the scale with a base and a platform. The platform has a window for viewing the display. The features of the window are variable to accommodate a number of displays for various scale models.

Another aspect of the invention is to provide a method for assembling an electronic weighing scale. The method includes the selection of a scale model. A printed circuit board (PCB) is assembled to a scale base. A display is selected for the scale model, and the display is assembled to the PCB.

The above aspects and other aspects, objects, features and advantages of the present invention are readily apparent from the following detailed description of the embodiments of the present invention when taken in connection with the accompanying drawings.

DETAILED DESCRIPTION OF EMBODIMENTS OF THE INVENTION

Figure 1:
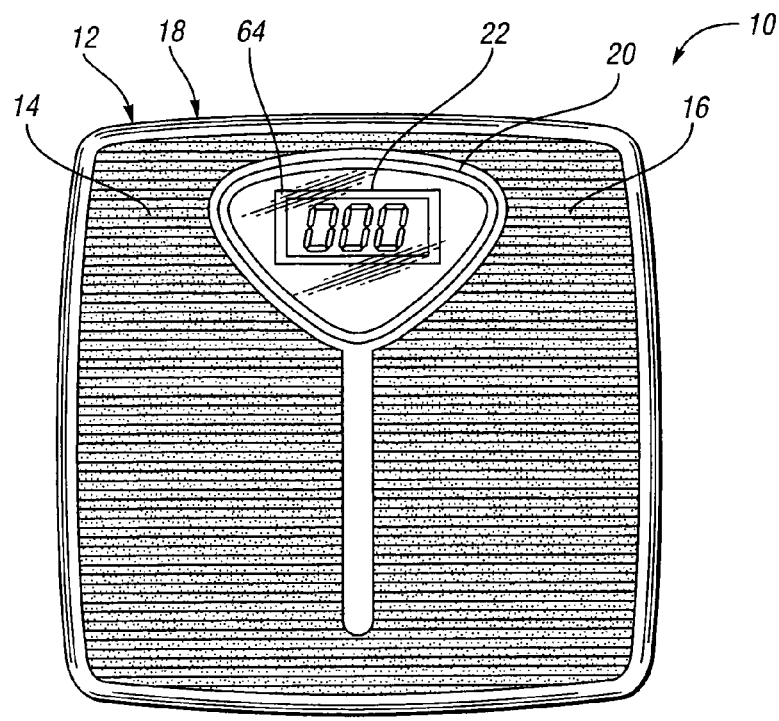
FIG. 1 is a top plan view of an electronic scale in accordance with the teachings of the present invention.

With reference now to FIG. 1, an electronic scale is illustrated in accordance with the teachings of the present invention, and is referenced generally by numeral 10. The electronic scale 10, as viewed from above, includes a platform cover 12 having a generally planar top surface 14 for receiving an object thereon, such as feet of a user. Accordingly, the top surface 14 may be provided with tread 16 for enhancing the traction thereupon. The platform cover 12 includes downward extending sidewalls 18 for covering the underlying structural components of the electronic scale 10 and any otherwise exposed operational components of the electronic scale 10.

The platform cover 12 may include a display window 20 for permitting the user to view a display 22 of the electronic scale 10. The electronic scale 10 is illustrated having a liquid crystal display (LCD). Of course, the invention contemplates that the present invention may be utilized with any electronic scale display.

Figure 2:
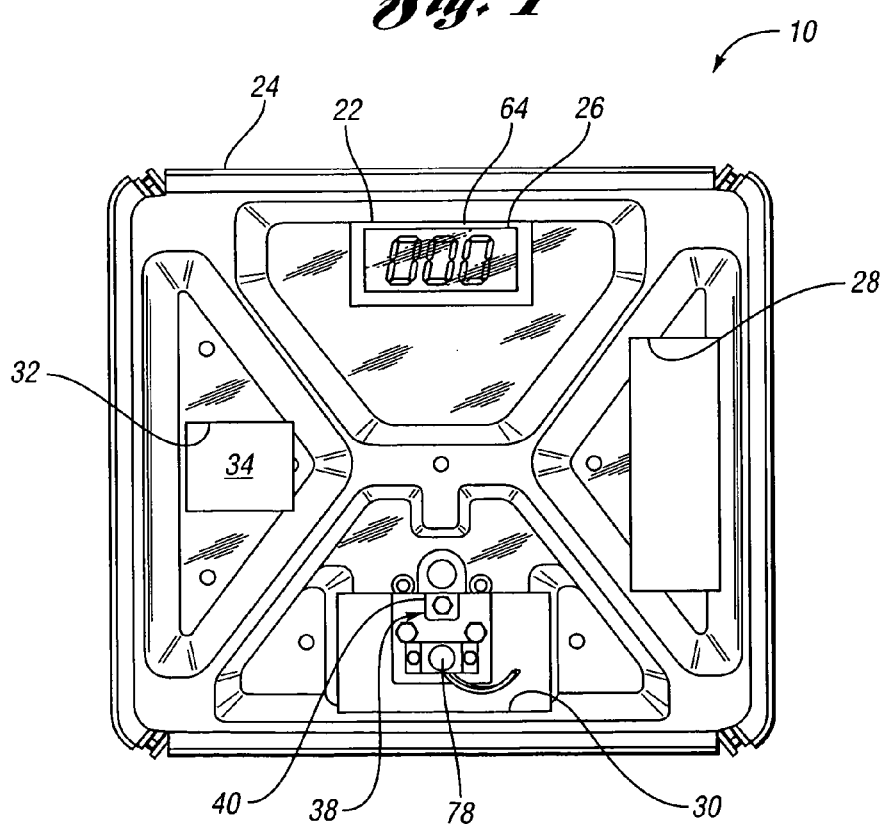
FIG. 2 is a top plan view of the electronic scale of FIG. 1, illustrated with a cover removed therefrom.

With reference now to FIG. 2, the electronic scale 10 is illustrated with the platform cover 12 (FIG. 1) removed. Accordingly, in FIG. 2 a platform 24 is illustrated that would otherwise be enclosed within the platform cover 12. The platform 24 may be formed from steel and may be stamped. The platform 24 is a structural member for receiving a load from the platform cover 12 and transmitting it to operational components of the electronic scale 10. The platform cover 12 (FIG. 1) is fastened to the platform 24 (FIG. 2) by a plurality of snap fasteners formed in the platform cover 12 that may be received within apertures formed in the platform 24. Of course, the invention contemplates that the platform cover 12 may be fastened to the platform 24 by a conventional fastener arrangement and/or adhesives.

The platform 24 includes a series of display apertures 26, 28, 30, 32. The display apertures 26, 28, 30, 32 are labeled sequentially in a clockwise direction in the illustration of FIG. 2. Each display aperture is oriented, for example, offset from another in a radial array having increments of ninety degrees. Thus, for the specific scale model illustrated in FIG. 1, the platform 24 is illustrated such that the first display aperture 26 is oriented and aligned with the display 22. Otherwise, for varying scale models and associated varying scale displays, the second, third and fourth display apertures 28, 30, 32 may be utilized by aligning the associated display aperture 26, 28, 30, 32 with the associated display by rotation of the platform 24 relative to the display 22.

Figure 3:
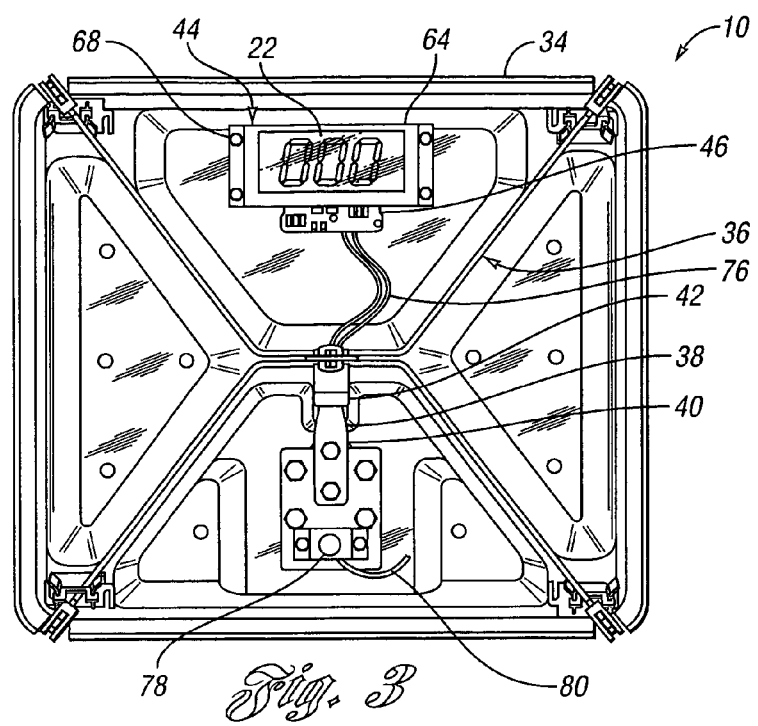
FIG. 3 is a top plan view of the electronic scale of FIG. 1, illustrated with a platform removed therefrom.

With reference now to FIG. 3, the electronic scale 10 is illustrated with the platform cover 12 and the platform 24 removed. The electronic scale 10 includes a base 34 for resting upon an underlying support surface. The base 34 may be formed from steel and may be fabricated from a stamping operation. Since the base 34 has a similar overall size and shape to that of the platform 24, the base 34 and the platform 24 may be fabricated from a common stamping operation.

Of course, the base 34 and platform 24 require differing hole patterns or other features and therefore these different features may be provided in subsequent stamping operations.

As illustrated, the electronic scale 10 is provided with a lever assembly 36 and a weight sensing mechanism 38. Briefly, the lever assembly 36 receives and supports the platform 24. When an object is placed upon the platform cover 12, the load is distributed through the lever assembly 36 to the weight sensing mechanism 38. The weight of the user is measured by the weight sensing mechanism 38 and the measurement is conveyed to the display 22. For the lever assembly 36 illustrated, the lever assembly includes fulcrum legs that extend through the base 34 and are supported directly upon the underlying support surface. Thus, the base 34 is part of the platform 24 and is fastened directly thereto by rivets formed therethrough or by other conventional fastening.

Alternatively, the base 34 may rest directly upon the underlying support surface. Legs, contact pads or the like may be affixed to the underside of the base 34 for engaging the underlying support surface. In this alternative arrangement, the platform 24 translates relative to the base 34 as a function of weight applied thereon. The platform 24 may be maintained assembled to the base 34 by a plurality of hook up spring assemblies, which are well known in the art. Hook up spring assemblies are disclosed in detail in U.S. Pat. No. 5,731,548, which issued to Williamson et al. on Mar. 24, 1998. The Williamson et al. U.S. Pat. No. 5,731,548 patent is incorporated in its entirety by reference herein.

The weight sensing mechanism 38 illustrated includes a load cell having a cantilevered beam 40 that is fastened to the base 34. The load cell includes a strain gauge 42 for measuring the strain of the beam 40. Of course, the invention contemplates any weight sensing mechanism for consequently providing an electronic output. For example, an electronic weight sensing mechanism may be utilized such as the one disclosed in U.S. Pat. No. 5,141,065, which issued on Aug. 25, 1992 to Maxwell et al. The Maxwell et al. U.S. Pat. No. 5,141,065 patent is incorporated in its entirety by reference herein.

The electronic scale 10 also includes a modular controller 44, which powers, controls and displays the result of the weight measurement of the scale 10.

Figure 4:
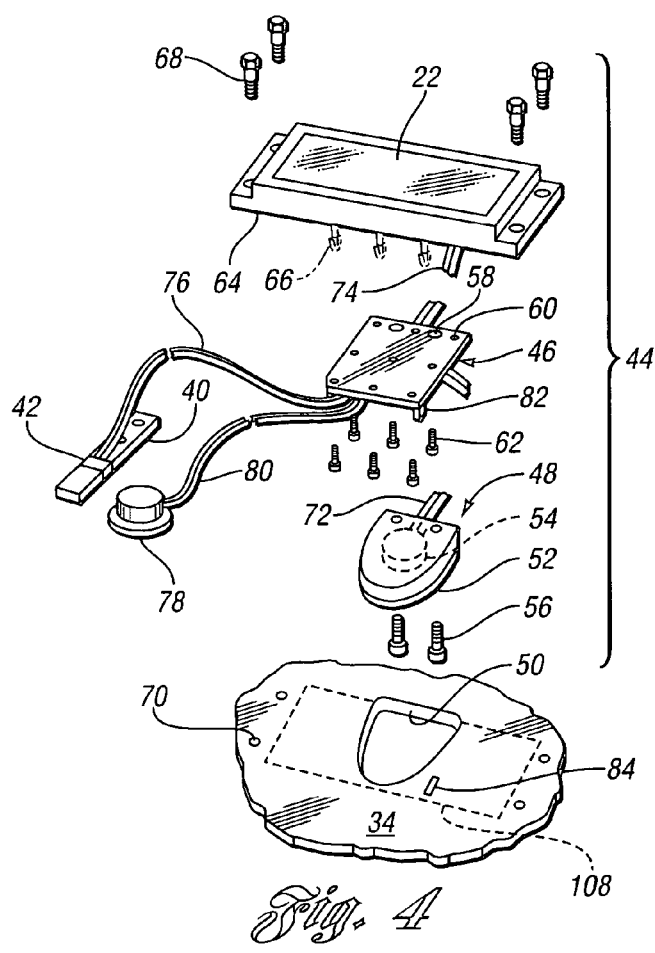
FIG. 4 is an enlarged partially exploded perspective view of a modular apparatus of the electronic scale of FIG. 1.

With reference now to FIG. 4, the controller 44 is illustrated partially exploded. The controller 44 includes the liquid crystal display 22, a printed circuit board (PCB) 46 and a battery housing 48. The display 22, PCB 46 and battery housing 48 may be collectively preassembled as a modular controller 44 prior to assembly of the scale 10. Subsequently, the controller 44 may be assembled to the base 34.

The base 34 includes an aperture 50 formed therethrough generally aligned with the battery housing 48. Specifically, the aperture 50 illustrated is shaped to at least partially receive the battery housing 48 therein. The battery housing 48 includes a door 52 thereon which is accessible externally from the base 34 so that a user may interchange a battery 54 housed therein when replacement is required. Alternatively, the battery housing 48 may include a step formed thereabout such that the battery housing 48 is retained within the base aperture 50 when the controller 44 is fastened to the base 34. Although the battery 54 is illustrated as the power supply for the scale controller 44, any power supply is contemplated within the scope of the present invention.

Prior to assembly of the controller 44 and the base 34, the battery housing 48 may be assembled to the controller 44. For example, a pair of threaded fasteners 56 may be provided for fastening the battery housing 48 to an underside of the PCB 46. Accordingly, the PCB 46 is illustrated with a pair of apertures 58 for threadably receiving the fasteners 56.

Alternatively, other fasteners may be utilized for fastening the battery housing 48 to the underside of the PCB 46. For example, apertures, threaded apertures, retaining clips, rivets, staking, adhesives, chemical fasteners, or the like may be provided as a fastener for securing the battery housing 48 to the PCB 46. The invention contemplates that for the exemplary embodiment modular controller 44 of FIG. 4, and for any other embodiments disclosed, that any type of fastener may be employed for assembling the embodiment. The fasteners illustrated, such as threaded fasteners 56 and apertures 58 are non-limiting and are illustrated and described to exemplify an embodiment of the invention and a method for assembling the embodiment. Of course, the invention contemplates various embodiments with various fastener types within the spirit and scope of the invention.

The PCB 46 may include an array of apertures 60 formed therein. The apertures 60 permit a variety of fastener engagements therewith. For example, the PCB 46 is illustrated with nine apertures 60 within the array. For the given display 22, a series of six threaded fasteners 62 are provided for fastening the PCB 46 to an associated hole pattern formed in an underside of the display 22. Specifically, the liquid crystal display 22 illustrated includes a display bracket 64 which has a series of threaded holes formed in the underside thereof for receiving the threaded fasteners 62. Although threaded fasteners 62 are illustrated, other fasteners may be utilized. For example, a plurality of retaining clips 66 may be provided extending from the underside of the display bracket 64 for fastening the display bracket 64 to the aperture 60 of the PCB 46.

The display bracket 64 includes a series of threaded fasteners 68 for fastening the display bracket 64 to a plurality of apertures 70 formed in the base 34. Thus, the preassembled controller 44 is collectively fastened to the base 34 by the fasteners 68 threadably engaged within apertures 70 of the base 34.

Due to the interchangeability of displays, such as the liquid crystal display 22 with the PCB 46, a variety of displays may be utilized within the controller 44. Referring again to FIG. 2, the platform 24 is oriented such that the corresponding display aperture 26, 28, 30, 32 is oriented and aligned with the corresponding display 22. Thus, a variety of scale models may be manufactured from the common platform 24 and base 34. Additionally, a plurality of scale models may be manufactured with a controller 44 having the printed circuit board 46 and battery housing 48. For each given scale model, an associated display is assembled to the controller 44 and attached to the base 34. The platform 24 is oriented so that the display 22 is viewable through the given display aperture 26, 28, 30, 32. Additionally, for each scale model, a model specific platform cover may be provided such as the platform cover 12 of FIG. 1.

With reference again to FIG. 4, the controller 44 includes a series of power wires 72 that extend from the battery housing 48 for powering the PCB 46 and the display 22. A plurality of wires 74 are provided between the display 22 and the PCB 46 for powering the display 22 from the power supply 72 and for imparting a signal to the display 22 corresponding to a weight measurement. The wires 74 may be connected to one of the display 22 or the PCB 46 by a plug for ease and quick assembly of the display 22 to the PCB 46.

The controller 44 may also include the load cell 40, 42, which is wired to the PCB 46 by wires 76. The controller may also include a power-on switch 78 with wires 80 directly wired to the PCB 46. The power-on switch 78 may be a foot switch which is actuatable externally from the scale 10 so that a user may actuate the switch 78 and subsequently step upon the platform cover 12 for a weight measurement. Otherwise, the power-on switch 78 may be operatively coupled to the weight sensing mechanism 38 so that upon application of a load to the platform cover 12, the power-on switch 78 is actuated thereby for beginning the control of the weight measurement operation.

The controller 44 may also include a measurement unit switch 82, which is illustrated mounted directly to the underside of the PCB 46. The measurement unit switch 82 regulates the units for which a weight measurement is displayed upon the liquid crystal display 22. For example, the measurement unit switch 82 is a pound/kilogram/stone switch for converting between standard units in pounds, metric units in kilograms, and English units in stones and pounds. Of course, the invention contemplates other units of mass or weight within the spirit and scope of the invention. An access slot 84 may be formed in the base 34 so that a user may access the measurement unit switch 82 for converting the operation of the scale 10 from one unit of measure to another.

In the assembly operation of the electronic scale 10, a plurality of modular controllers 44 may be provided, each with the PCB 46, the battery housing 48, the load cell 40, 42 and the power-on switch 78 preassembled. For the assembly operation of a specific scale model, such as electronic scale 10, the display 22 is assembled to the PCB 46 and the display 22 is subsequently assembled to the base 34. Common PCBs 46 may be utilized for different scale models. Thus, large quantities of PCBs 46 may be stocked for minimizing costs in circuitry. The controllers 44 could be preassembled with model specific displays so that the assembly operation simply requires assembly of the modular controller 44 to the base 34. Referring again to FIG. 3, the base 34 is generally rectangular. Thus, the modular controller 44 may be placed at any of a number of positions upon the base 34. For example, the modular controller could be placed at a 3 o'clock orientation in FIG. 3 for alignment with one of the second or fourth display apertures 28, 32 from FIG. 2.

Figure 5:
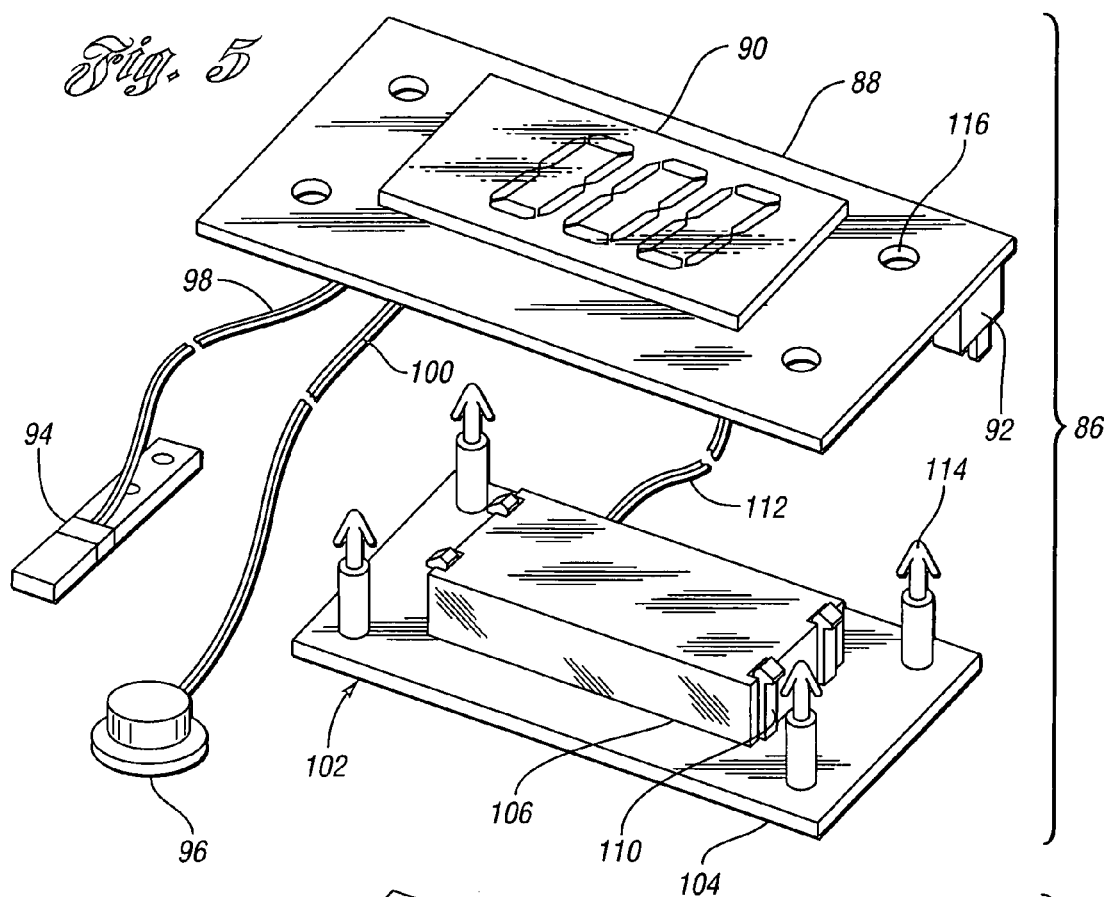
FIG. 5 is an enlarged partially exploded perspective view of an alternative modular apparatus for an electronic scale in accordance with the teachings of the present invention.

With reference now to FIG. 5, an alternative embodiment modular controller 86 is illustrated in accordance with the present invention. The controller 86 is a two-piece design that is easily snapped together for assembly. The controller 86 includes a PCB 88 with an LCD 90 mounted thereon and electronically interconnected therewith. A measurement unit switch 92 is provided on the underside of the PCB 88. A load cell 94 and a foot switch 96 are wired to the PCB 92 via wires 98, 100 respectively.

The second component of the controller 86 is a battery housing 102. The battery housing 102 includes a plate 104 that is disposed on an underside of the base 34. Extending upward from the plate 104 is a battery pack 106 which is accessible from an underside of the plate 104. The battery housing 102 is assembled with the base 34 by insertion of the battery pack 106 into an aperture in the base 34, such as the aperture 108 illustrated in phantom in FIG. 4. Referring again to FIG. 5, the battery housing 102 includes a plurality of retainer clips 110 each oriented around the battery pack 106. Upon the insertion of the battery pack 106 into the base aperture 108, the retainer clips 110 secure the battery housing 102 to the base 34. A plurality of power supply wires 112 are connected to the PCB 88 for powering the PCB 88 and the LCD 90.

The battery housing 102 includes a plurality of upstanding arrow clips 114 which extend through the apertures 70 formed in the base 34 and are provided for fastening the PCB 88 to the battery housing 102. Accordingly, a corresponding series of apertures 116 are provided in the PCB 88 for receiving the arrow clips 114.

In summary, the controller 86 is assembled with the base 34 by snapping the battery housing 102 into the base 34. The PCB 88 is selected with the LCD 90 corresponding to the associated scale model. The power supply wires 112 are connected therebetween and the PCB 88 is snapped upon the arrow clips 114. Thus, the modular controller 86 facilitates ease in assembly and reduces manufacturing costs associated therewith.

Figure 6:
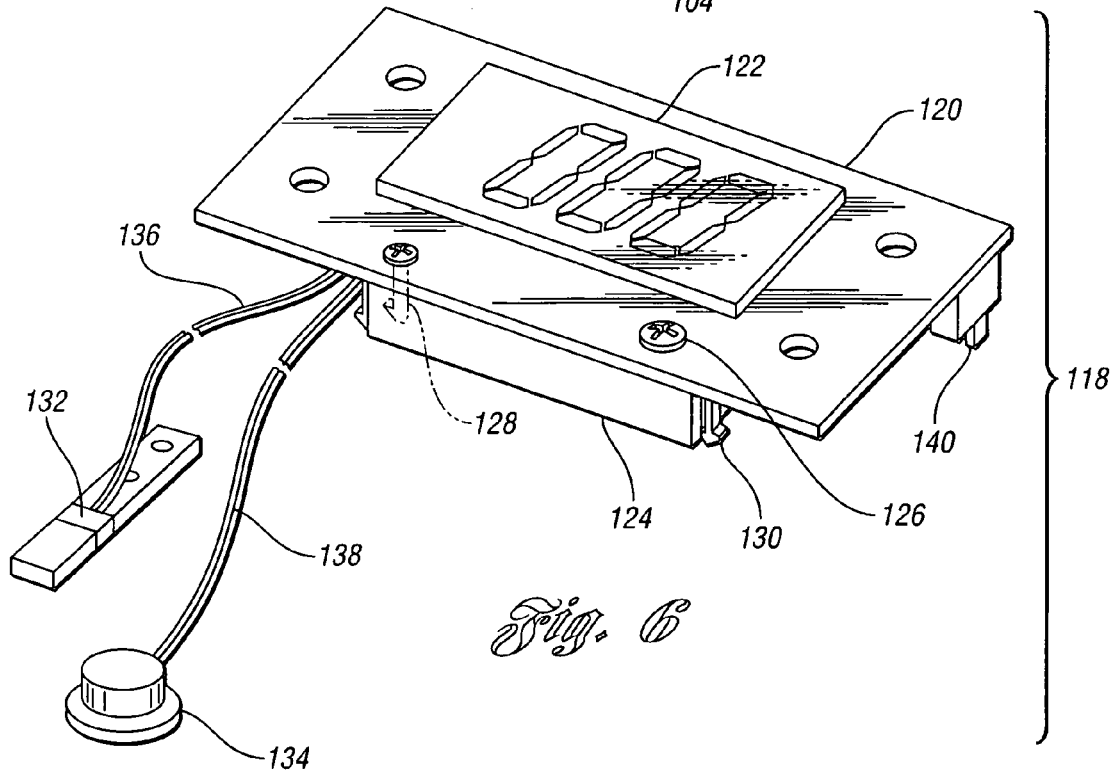
FIG. 6 is an enlarged perspective view of another alternative embodiment modular apparatus in accordance with the teachings of the present invention.

Referring now to FIG. 6, an alternative modular controller 118 is illustrated in accordance with the present invention. The controller 118 includes a PCB 120 with a model specific LCD 122 fastened thereto. The controller 118 includes a battery housing 124 secured to the PCB 120 by a plurality of screws 126. Alternatively, a plurality of retaining clips may be provided extending from the PCB 120. The alternative retaining clips are illustrated in phantom and labeled by reference numeral 128.

A plurality of retaining clips 130 extend from the PCB 120. Upon assembly of the controller 118 to the scale base 34, the battery housing 124 is inserted into the scale base aperture 108 and the retaining clips 130 fasten the controller 118 to the base 34. The controller 118 also includes a load cell 132, foot switch 134 and wires 136, 138 respectively wiring the load cell 132 and foot switch 134 to the PCB 120. The controller 118 also includes a measurement unit switch 140 mounted to an underside of the PCB 120. The controller 118 may be preassembled with a model specific display such as LCD 122 for assembly into a specific scale model. Alternatively, a display may be assembled during the scale assembly process. Accordingly, the controller 118 is simply snapped into the base 34 of the associated scale.

Figure 7:
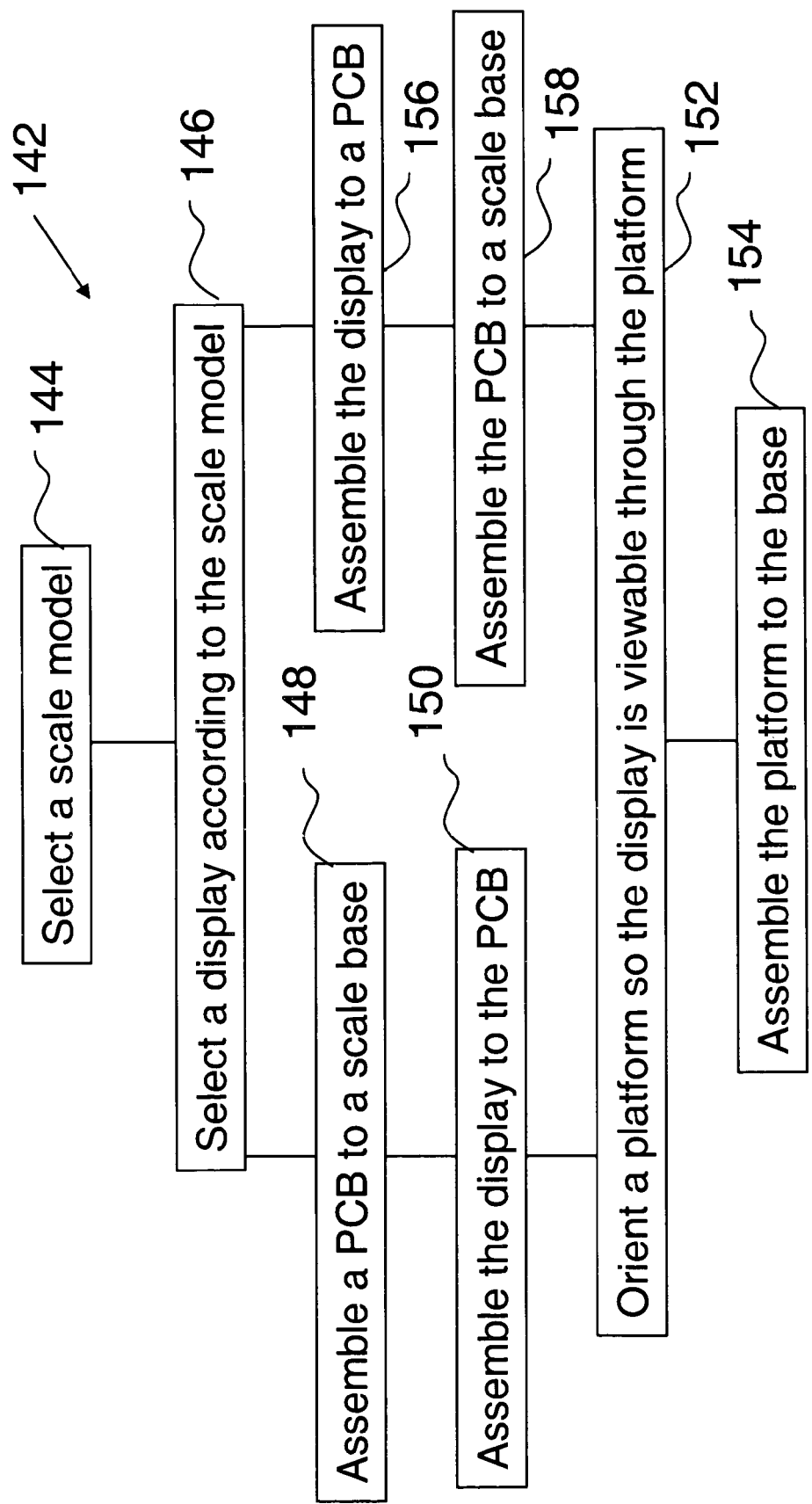
FIG. 7 is a block diagram of a method for assembling an electronic weighing scale.

Referring now to FIG. 7, an exemplary method for assembly is illustrated in block diagram format and is referenced generally by numeral 142. In block 144, a scale model is selected. Subsequently, in block 146, a display is selected according to the scale model. A PCB is assembled to a scale base in block 148. A display is assembled to the PCB in block 150. In block 152, the platform is oriented such that the display is viewable through the platform. In block 154, the platform is assembled to the base.

The sequence of assembly operations is not limited. For example, a plurality of displays may be assembled to the PCB prior to the scale assembly operation. After block 146, the display may be assembled to a PCB in block 156 prior to the PCB being assembled to a scale base as in block 158. Subsequently the platform may be oriented and assembled to the base as in blocks 152 and 154.

In summary, a modular assembly method and apparatus is disclosed for utilizing common components for various scale models while minimizing the variations in assembly steps for each specific model.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for an electronic weighing scale, the apparatus comprising:

a battery housing for retaining a battery for powering an electronic weighing scale, the battery housing having a fastener;
a printed circuit board (PCB) for controlling the electronic weighing scale;
a display affixed and operatively connected to the PCB;
a base for supporting the electronic scale upon an underlying support surface; and
a platform mounted to the base for receiving a user thereupon;
wherein one of the PCB and display includes a fastener for receiving the battery housing fastener, such that the battery housing, PCB and display are operatively connected and the PCB is powered by the battery housing for conveying a signal to the display;
wherein the PCB is adapted to accommodate a number of displays of varying sizes; and
wherein the assembled battery housing, PCB and display are orientated within the platform and the base.

2. An electronic weighing scale comprising:
a base for supporting the electronic scale upon an underlying support surface;
a platform mounted to the base for receiving a user thereupon;
a battery housing for retaining a battery for powering an electronic weighing scale, the battery housing having a fastener;
a printed circuit board (PCB) for controlling the electronic weighing scale; and
a display affixed and operatively connected to the PCB;
wherein the PCB includes the fastener for receiving the battery housing fastener, such that the battery housing, PCB and display are operatively connected and the PCB is powered by the battery housing for conveying a signal to the display; and
wherein the assembled battery housing, PCB and display are orientated within the platform and the base.

3. An electronic weighing scale comprising:
a base for supporting the electronic scale upon an underlying support surface;
a platform mounted to the base for receiving a user thereupon;
a battery housing for retaining a battery for powering an electronic weighing scale, the battery housing having a fastener;
a printed circuit board (PCB) for controlling the electronic weighing scale;
a display affixed and operatively connected to the PCB; and
a display bracket;
wherein one of the PCB and display includes a fastener for receiving the battery housing fastener, such that the battery housing, PCB and display are operatively connected and the PCB is powered by the battery housing for conveying a signal to the display;
wherein the assembled battery housing, PCB and display are orientated within the platform and the base; and
wherein the display bracket includes a fastener for securing the assembled battery housing, PCB and display to the base of the weighing scale.

4. An electronic weighing scale comprising:
a base for supporting the electronic scale upon an underlying support surface;
a platform mounted to the base for receiving a user thereupon;
a battery housing for retaining a battery for powering an electronic weighing scale, the battery housing having a fastener;
a printed circuit board (PCB) for controlling the electronic weighing scale; and
a display affixed and operatively connected to the PCB;
wherein one of the PCB and display includes a fastener for receiving the battery housing fastener, such that the battery housing, PCB and display are operatively connected and the PCB is powered by the battery housing for conveying a signal to the display;
wherein the assembled battery housing, PCB and display are orientated within the platform and the base; and
wherein the battery housing further comprises a fastener for securing the assembled battery housing, PCB and display to the base of the weighing scale.

5. An apparatus for an electronic weighing scale, the apparatus comprising:
a battery housing for retaining a battery for powering an electronic weighing scale, the battery housing having a fastener;
a printed circuit board (PCB) for controlling the electronic weighing scale;
a display affixed and operatively connected to the PCB; and
a scale base having at least one aperture formed therein;
wherein one of the PCB and display includes a fastener for receiving the battery housing fastener, such that the battery housing, PCB and display are operatively connected and the PCB is powered by the battery housing for conveying a signal to the display;
wherein the assembled battery housing, PCB and display are orientated within the platform and the base; and
wherein the battery housing further comprises a plurality of retainer clips each adapted to be fastenably received within the at least one scale base aperture.

6. The apparatus of claim 1 wherein the battery housing, PCB and display collectively define a modular apparatus that is preassembled prior to assembly with a weighing scale.

7. The apparatus of claim 1 wherein the PCB is operatively connected to a load cell.

8. The apparatus of claim 1 wherein the PCB is operatively connected to a power switch.

9. The apparatus of claim 1 wherein the PCB is operatively connected to a measurement unit switch.

10. The apparatus of claim 1 wherein the battery housing fastener is further defined as a plurality of apertures.

11. An apparatus for an electronic weighing scale, the apparatus comprising:
a battery housing for retaining a battery for powering an electronic weighing scale, the battery housing having a fastener;
a printed circuit board (PCB) for controlling the electronic weighing scale; and
a display affixed and operatively connected to the PCB;
wherein one of the PCB and display includes a fastener for receiving the battery housing fastener, such that the battery housing, PCB and display are operatively connected and the PCB is powered by the battery housing for conveying a signal to the display; and
wherein the PCB is adapted to accommodate a number of displays of varying sizes;
wherein the battery housing fastener is further defined as a plurality of apertures; and
wherein the fastener for receiving the battery housing fastener is further defined as a plurality of retainer clips each adapted to be fastenably received within one of the battery housing apertures.

12. The apparatus of claim 10 wherein the fastener for receiving the battery housing fastener is further defined as a plurality of screws each adapted to be fastenably received within one of the battery housing apertures.

13. A modular apparatus for an electronic weighing scale, the modular apparatus comprising:
   a printed circuit board (PCB) having a fastener; and
   a display having a fastener for operatively connecting to the PCB;
   wherein the PCB fastener is adapted to accommodate a number of displays of varying sizes or fastener locations; and
   wherein one of the PCB fastener and the display fastener is further defined as
   a plurality of retaining clips and the other of the PCB fastener and the display fastener is further defined as a corresponding plurality of apertures.

14. The modular apparatus of claim 13 wherein the PCB fastener is further defined as at least two apertures.

15. The modular apparatus of claim 13 wherein the electronic weighing scale includes a base and a platform having a window for viewing the display, the location and/or dimensions of the window being variable to accommodate a number of displays of varying scale models.

* * * * *